(12) United States Patent
Shubs, Jr. et al.

(10) Patent No.: US 10,864,928 B2
(45) Date of Patent: Dec. 15, 2020

(54) MONITORING SYSTEM FOR TRAIN

(71) Applicant: Progress Rail Locomotive Inc., LaGrange, IL (US)

(72) Inventors: Alexander Shubs, Jr., Mount Prospect, IL (US); David Matthew Roenspies, Elburn, IL (US); James David Seaton, Downers Grove, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 318 days.

(21) Appl. No.: 15/786,704

(22) Filed: Oct. 18, 2017

(65) Prior Publication Data

US 2019/0111952 A1    Apr. 18, 2019

(51) Int. Cl.
*G05D 1/00* (2006.01)
*G05D 3/00* (2006.01)
(Continued)

(52) U.S. Cl.
CPC ......... *B61L 23/041* (2013.01); *B61L 15/0072* (2013.01); *B61L 15/0081* (2013.01); *G06K 9/00228* (2013.01); *G06K 9/00785* (2013.01); *G08B 21/18* (2013.01); *H04N 7/18* (2013.01); *H04N 7/188* (2013.01); *H04N 21/44008* (2013.01); *B61L 3/002* (2013.01)

(58) Field of Classification Search
CPC ............... B61L 23/041; B61L 15/0081; B61L 15/0072; B61L 3/002; H04N 7/18; H04N 21/44008; H04N 7/188; H04N 5/28; H04N 5/76; H04N 5/232; H04N 9/877; H04N 9/8205; H04N 9/8063; H04N 9/8042; H04N 9/7921; H04N 5/781; H04N 5/775; H04N 5/77; H04N 5/765; H04N 9/8227; G08B 21/18; G06K 9/00228; G07C 5/0891; G07C 5/085; G07C 5/008
See application file for complete search history.

(56) References Cited

U.S. PATENT DOCUMENTS 5,340,062 A * 8/1994 Heggestad ............... B61L 3/008
                                                      246/167 R
5,867,122 A * 2/1999 Zahm ...................... G01S 19/14
                                                       342/357.33
(Continued)

OTHER PUBLICATIONS

Hayashi, Monitoring system, JP2008167222A, 2008 (Year: 2008).*

*Primary Examiner* — Harry Y Oh
(74) *Attorney, Agent, or Firm* — Miller, Matthias & Hull

(57) ABSTRACT

A monitoring system for a train is provided. The monitoring system includes an image capturing device configured to capture a video feed of a designated area associated with the train. The monitoring system also includes a controller coupled to the image capturing device. The controller is configured to receive the video feed from the image capturing device. The controller is configured to analyze the video feed to determine if a predefined triggering event has occurred. The controller is configured to record and store a predefined length of the video feed based on the determination. The controller is configured to provide a notification of the recorded video feed to a user through a user interface. The controller is configured to allow the user to access at least a portion of the recorded video feed through the notification.

20 Claims, 4 Drawing Sheets

(51) Int. Cl.
   *G06F 7/00*      (2006.01)
   *G06F 17/00*     (2019.01)
   *B61L 23/04*     (2006.01)
   *B61L 15/00*     (2006.01)
   *G08B 21/18*     (2006.01)
   *H04N 7/18*      (2006.01)
   *H04N 21/44*     (2011.01)
   *G06K 9/00*      (2006.01)
   *B61L 3/00*      (2006.01)

(56) References Cited

U.S. PATENT DOCUMENTS

| | | | |
|---|---|---|---|
| 7,768,548 B2* | 8/2010 | Silvernail | G07C 5/0891 |
| | | | 348/117 |
| 8,473,143 B2 | 6/2013 | Stark et al. | |
| 9,296,401 B1* | 3/2016 | Palmer | B61L 15/0072 |
| 9,639,804 B1* | 5/2017 | Palmer | B60W 40/09 |
| 2004/0223054 A1 | 11/2004 | Rotholtz | |
| 2007/0135979 A1* | 6/2007 | Plante | G08G 1/20 |
| | | | 701/33.4 |
| 2007/0216771 A1 | 9/2007 | Kumar | |
| 2008/0072251 A1* | 3/2008 | Namvar | G06Q 30/02 |
| | | | 725/36 |
| 2011/0010624 A1* | 1/2011 | Vanslette | G06Q 50/04 |
| | | | 715/704 |
| 2013/0317711 A1 | 11/2013 | Plante | |
| 2014/0002651 A1* | 1/2014 | Plante | G08G 1/20 |
| | | | 348/148 |
| 2015/0195483 A1 | 7/2015 | Miller et al. | |
| 2016/0129883 A1* | 5/2016 | Penilla | B60R 25/305 |
| | | | 348/148 |
| 2019/0188930 A1* | 6/2019 | Tsukahara | G07C 5/0866 |
| 2019/0228228 A1* | 7/2019 | Tsukahara | G06K 9/00718 |

* cited by examiner

MONITORING SYSTEM FOR TRAIN

TECHNICAL FIELD

The present disclosure relates to a monitoring system, and more specifically, to the monitoring system for a train.

BACKGROUND

Cameras and other image capturing devices may be present on trains to capture videos for monitoring the train and surrounding areas. These cameras capture real-time video indicative of current conditions on the train. An operator may then manually monitor the video in real-time to ensure that no rail events take place. These rail events may include, collision with objects, collision with another train, absence of a rail driver from his seat, and so on. Hence, constant monitoring of the video may be required to ensure that these rail events do not take place.

However, sometimes an event of interest, potentially leading to the rail event, may occur during a time when the operator is not focused on viewing activities of a particular train as the video is being captured. In such cases, there is a need to capture relevant video information and preserve this data for later review by the operator.

U.S. Pat. No. 9,296,401 relates to a system configured to detect rail vehicle events. Some or all of the system may be installed in a rail vehicle and/or be otherwise coupled with the rail vehicle. In some implementations, the system may detect rail vehicle events based on pre-determined rail vehicle event criteria sets. The system may include one or more sensors configured to generate output signals conveying information related to the rail vehicle. In some implementations, the system may detect rail vehicle events based on a comparison of the information conveyed by the output signals from the sensors and/or parameters determined based on the output signals to the pre-determined rail vehicle event criteria sets.

SUMMARY OF THE DISCLOSURE

In one aspect of the present disclosure, a monitoring system for a train is provided. The monitoring system includes an image capturing device configured to capture a video feed of a designated area associated with the train. The monitoring system also includes a controller coupled to the image capturing device. The controller is configured to receive the video feed from the image capturing device. The controller is configured to analyze the video feed to determine if a predefined triggering event has occurred. The controller is configured to record and store a predefined length of the video feed based on the determination. The controller is configured to provide a notification of the recorded video feed to a user through a user interface. The controller is configured to allow the user to access at least a portion of the recorded video feed through the notification.

In another aspect of the present disclosure, a method for monitoring a train is provided. The method includes receiving, by a controller, a video feed of a designated area associated with the train from an image capturing device. The method includes analyzing, by the controller, the video feed to determine if a predefined triggering event has occurred. The method includes recording and storing, by the controller, a predefined length of the video feed based on the determination. The method includes providing, by the controller, a notification of the recorded video feed to a user through a user interface. The method includes allowing, by the controller, the user to access at least a portion of the recorded video feed through the notification.

In yet another aspect of the present disclosure, a train is provided. The train includes an engine and a monitoring system. The monitoring system includes an image capturing device configured to capture a video feed of a designated area associated with the train. The monitoring system includes a controller coupled to the image capturing device. The controller is configured to receive the video feed from the image capturing device. The controller is configured to analyze the video feed to determine if a predefined triggering event has occurred. The controller is configured to record and store a predefined length of the video feed based on the determination. The controller is configured to provide a notification of the recorded video feed to a user through a user interface. The controller is configured to allow the user to access at least a portion of the recorded video feed through the notification.

Other features and aspects of this disclosure will be apparent from the following description and the accompanying drawings.

DETAILED DESCRIPTION

Figure 1:
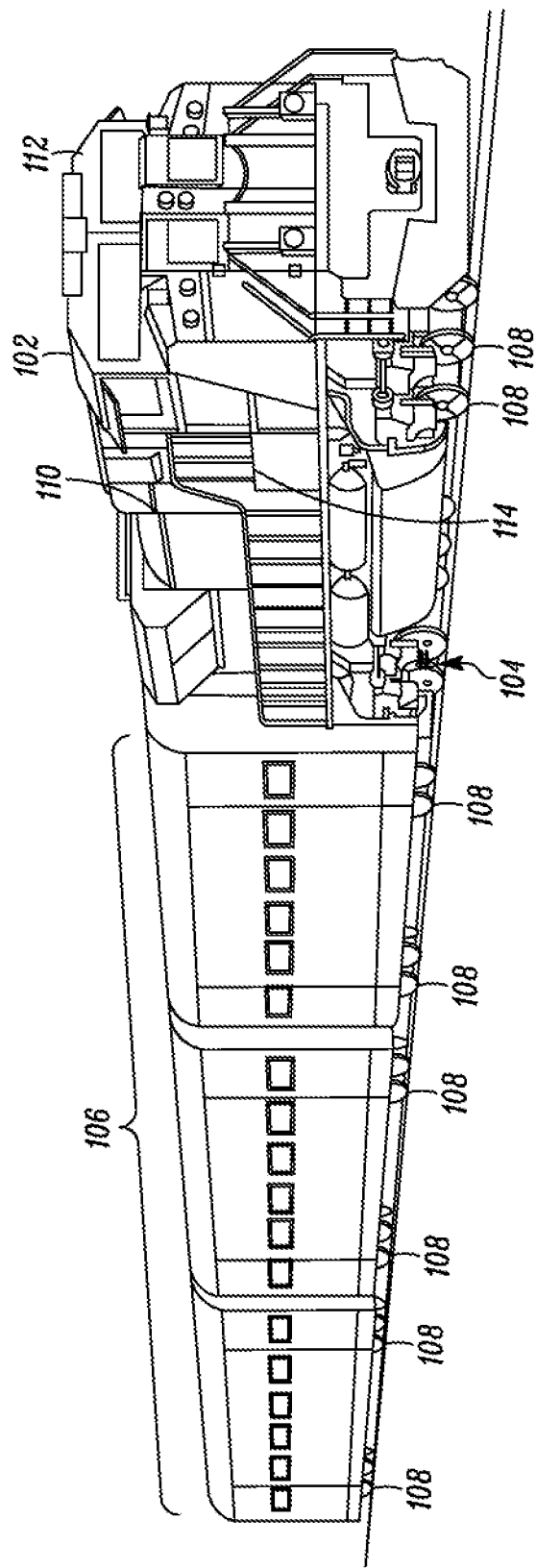
FIG. 1 is a perspective view of an exemplary train, in accordance with the concepts of the present disclosure.

Referring to FIG. 1, an exemplary train 100 is illustrated. The train 100 includes a locomotive 102, chassis 104, and a number of wagons 106. The locomotive 102 and the wagons 106 have a number of wheels 108. Further, the locomotive 102 includes a body 110, an operator cab 112, and a walking platform 114. The wagons 106 are utilized for carrying goods or services, or carrying goods or passengers from one location to another.

The train 100 includes the locomotive 102 having a combustion engine (not shown), specifically a diesel engine, which drives an alternator (not shown). The alternator provides electrical power to traction motors (not shown), which are mounted on the chassis 104 to drive the wheels 108. Further, the locomotive 102 has the operator cab 112 and the walking platform 114 that surrounds the body 110 of the locomotive 102.

The locomotive 102 may be an electric locomotive as well, without departing from the scope of the disclosure. The train 100 further includes various other components such as, but not limited to, a number of doors and windows. For the purpose of simplicity, the various other components of the train 100 are not labeled in FIG. 1. The train 100 may include more than one locomotive 102 as well, without departing from the scope of the disclosure.

Figure 2:
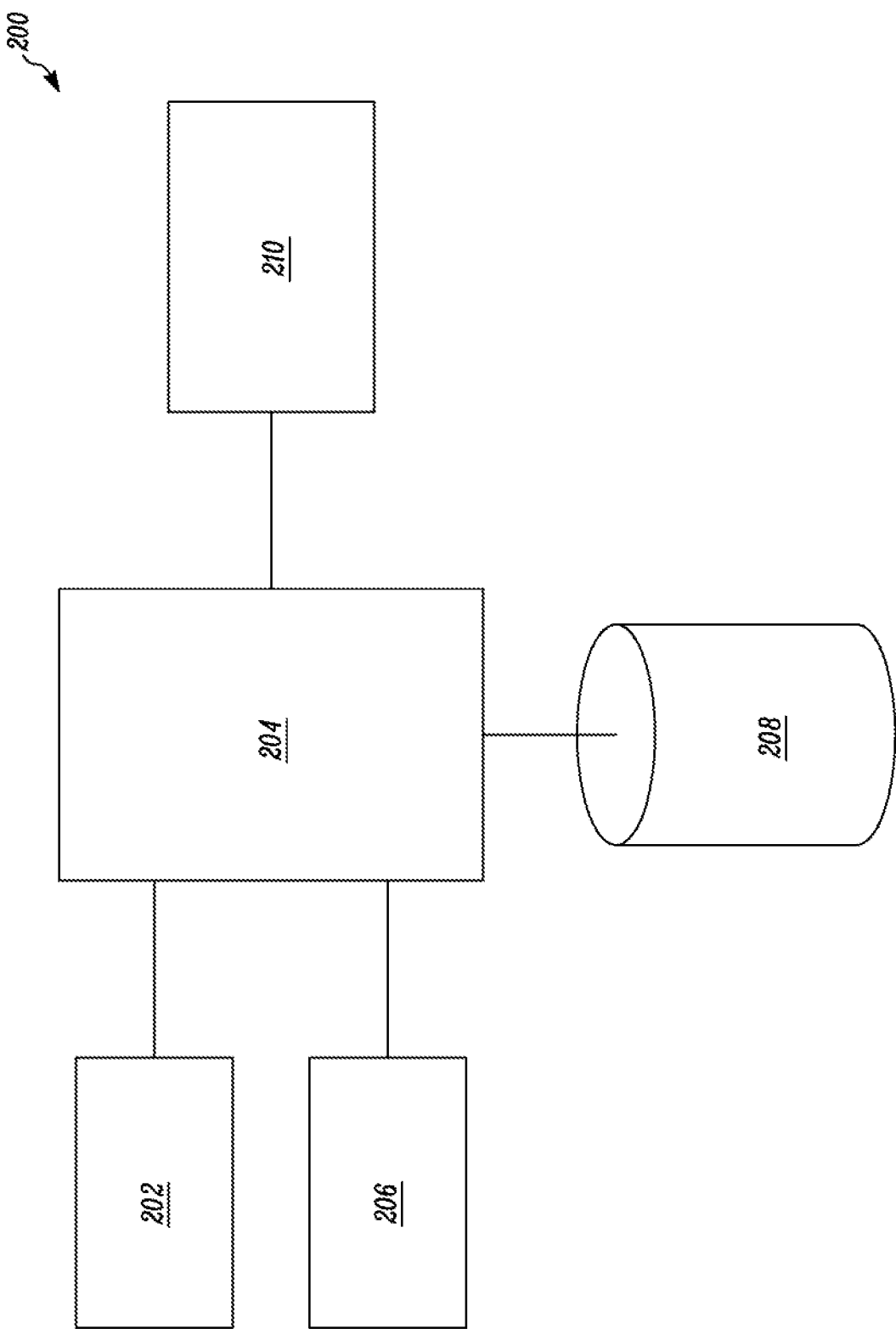
FIG. 2 is a block diagram of a monitoring system associated with the train of FIG. 1, in accordance with the concepts of the present disclosure.

The present disclosure relates to a monitoring system 200 for the train 100. Referring to FIG. 2, the monitoring system 200 includes an image capturing device 202. The image capturing device 202 may be a camera, a camcorder, or any video or image capturing device 202. The image capturing device 202 is configured to capture a video feed of a designated area associated with the train 100. More specifically, the image capturing device 202 is configured to capture the video feed of the area associated with the train 100 that requires monitoring by some user or other train personnel. For example, the image capturing device 202 may capture the video feed of an area inside the train 100 and may accordingly be mounted within the train 100.

Alternatively, the image capturing device 202 may capture the video feed of an area outside the train 100 and may thus be mounted at an appropriate location. In yet another example, the image capturing device 202 may be mounted on infrastructure associated with the train 100 such as, a bridge, so that the video feed of multiple trains passing under the bridge may be captured. Thus, based on the designated area that is to be monitored, the location of the image capturing device 202 may vary. Further, there may be multiple image capturing devices positioned at different locations to allow surveillance or monitoring of various such areas associated with the train 100. Based on the requirement, different views captured by the multiple image capturing devices may be monitored on a standalone basis or may be combined to obtain a 360° degree view for inspection. For example, the image capturing devices may be present within the operator cab 112 of a locomotive, forward of the train 100, behind the train 100, along the wheels 100 of the train 100, and so on.

The user may view the video feed captured by the image capturing device 202 to detect occurrences of a rail event. Certain triggering events that indicate a start of these rail events may be predetermined and defined by the system 200. The image capturing device 202 captures the video feed of, for example, an operation of the train 100, an operator seated in the operator cab 112 of the train 100, passengers, an environment surrounding the train 100, and/or other factors related to the train 100 for detection of the triggering event. The rail vehicle events may include, but are not limited to, collisions with other vehicles and/or pedestrians, near collisions, a specific behavior and/or driving maneuver performed by a train operator such as unsafe backing, unsafe braking, unsafe railroad crossing, unsafe turning, operating the train 100 with hands off of the control lever and/or any other similar maneuver, passing a signal bar, failure to yield to pedestrians, activation of a specific rail vehicle safety system (such as a track brake and/or an emergency brake) and train 100 operating parameters (e.g., speed) exceeding threshold values.

The image capturing device 202 is coupled to a controller 204. The controller 204 receives the video feed captured by the image capturing device 202. The controller 204 analyses the video feed to detect if the triggering event has occurred. As described earlier, the occurrence of the triggering event is indicative that the potential predefined rail event will take place.

In one example, the controller 204 performs image analysis on the video feed to identify if the triggering event has occurred. The controller 204 may analyze the image or video on a frame by frame basis to determine if the triggering event has occurred. One of ordinary skill in the art will appreciate that known image analysis and comparison techniques may be used to analyze the video feed to detect if the triggering event has occurred. More specifically, the controller 204 may search for occurrences of predefined events that are indicative of the start of the triggering event.

The controller 204 may additionally be coupled to other sensors or subsystems associated with the train 100 for effectively monitoring the train 100. For example, the controller 204 may be coupled to an electronic control module 206 (ECM) of the train 100. The controller 204 may combine signals received from the ECM 206 and other sensors with the video feed to verify the occurrence of the triggering event. Objects associated with the train 100 may also be detected by the controller 204 based on signals received from external detectors, such as, RADAR, SONAR, etc. Alternatively, the controller 204 may analyze the video feed to detect object location relative to tracks of the train 100. In other examples, the controller 204 may estimate a distance to the object determined by analyzing a speed of the train 100 along with observed changes in object dimension from frame to frame of the video feed.

Some exemplary triggering events may include, detection of an object being dragged from the train 100 by the controller 204. Others may include detection of an object colliding with the wheel of the train 100 by the controller 204. In some cases, when the image capturing device 202 captures the video feed of the environment next to the train 100, the video feed may contain data of a passing train. By capturing video information of the passing train along with time and location of a host train may allow the controller 204 to physically track the passing train. Alternatively, the controller 204 may use visual recognition, for example OCR, of a particular train asset included in the passing train to track the passing train and/or train asset.

If the controller 204 detects that the triggering event has occurred, the controller 204 logs and stores a predefined length of the video feed so that the recorded event may be logged and viewed by the user. The controller 204 stores a timestamp of the start of the triggering event. The stored timestamp may assist in post event image analysis, physical tracking of other train assets, and the like. Further, the controller 204 may determine the length of the video feed to be recorded by storing a predetermined length of the video feed before the start of the triggering event. The final length of the video feed to be recorded may be predetermined by the system. For example, if the controller 204 determines that the triggering event has occurred, the controller 204 records the video feed a few seconds prior to the triggering event, say five seconds before the triggering event, and further continues to record the video feed for the predetermined length after an end of the triggering event.

The controller 204 is configured to record and store the video feed in a database 208. The database 208 is coupled to the controller 204. The database 208 is any known online or offline storage device. The database 208 may be easily accessed by the controller 204 for retrieval of the stored video feed as and when required. Alternatively, the video feed may be stored in a memory of the controller 204.

After detecting that the triggering event has occurred, the controller 204 analyzes and determines a type of the triggering event. The triggering event may be any one of a low priority, a medium priority, or a high priority event. If the controller 204 determines that the high priority type event has occurred, the controller 204 alerts the user of the occurrence of the triggering event through a notification and allows a user to view the recorded event in real-time. If the controller 204 determines that a low or medium priority type event has occurred, the controller 204 logs and flags the recorded video for later viewing by the user.

The controller 204 is also coupled to a display unit 210. The display unit 210 may be present in the operator cab 112 of the train 100. Alternatively, the display unit 210 may be present a remote location away from the train 100. The display unit 210 may include any known output unit such as a screen, a monitor, a touchscreen, a control panel display, and so on. The controller 204 is configured to provide the notification of the recorded video feed to the user through the display unit 210. The notification may be a URL link, a thumbnail, a set of images, a snippet or preview of the recorded video feed.

The notification is an easy to view representation of the recorded video feed to alert the user of the occurrence of the triggering event. The notification is provided on a user interface that is displayed on the display unit 210. By interacting with the notification, for example through a cursor over or click event, the user can access and view at least a portion of the recorded video feed associated with the occurrence of the triggering event. In one example, the user may need to login to a secure portal to view the user interface. Based on the user privileges, the user can view the recorded video feed through the notification provided on the user interface. The controller 204 pushes the notification, in the form of the URL link, thumbnail, set of images, or video snippet to the user interface on the display unit 210 where the recorded video feed is displayed. The notification provides access to the captured video feed and assists in reviewing the recorded video feed.

Figure 3:
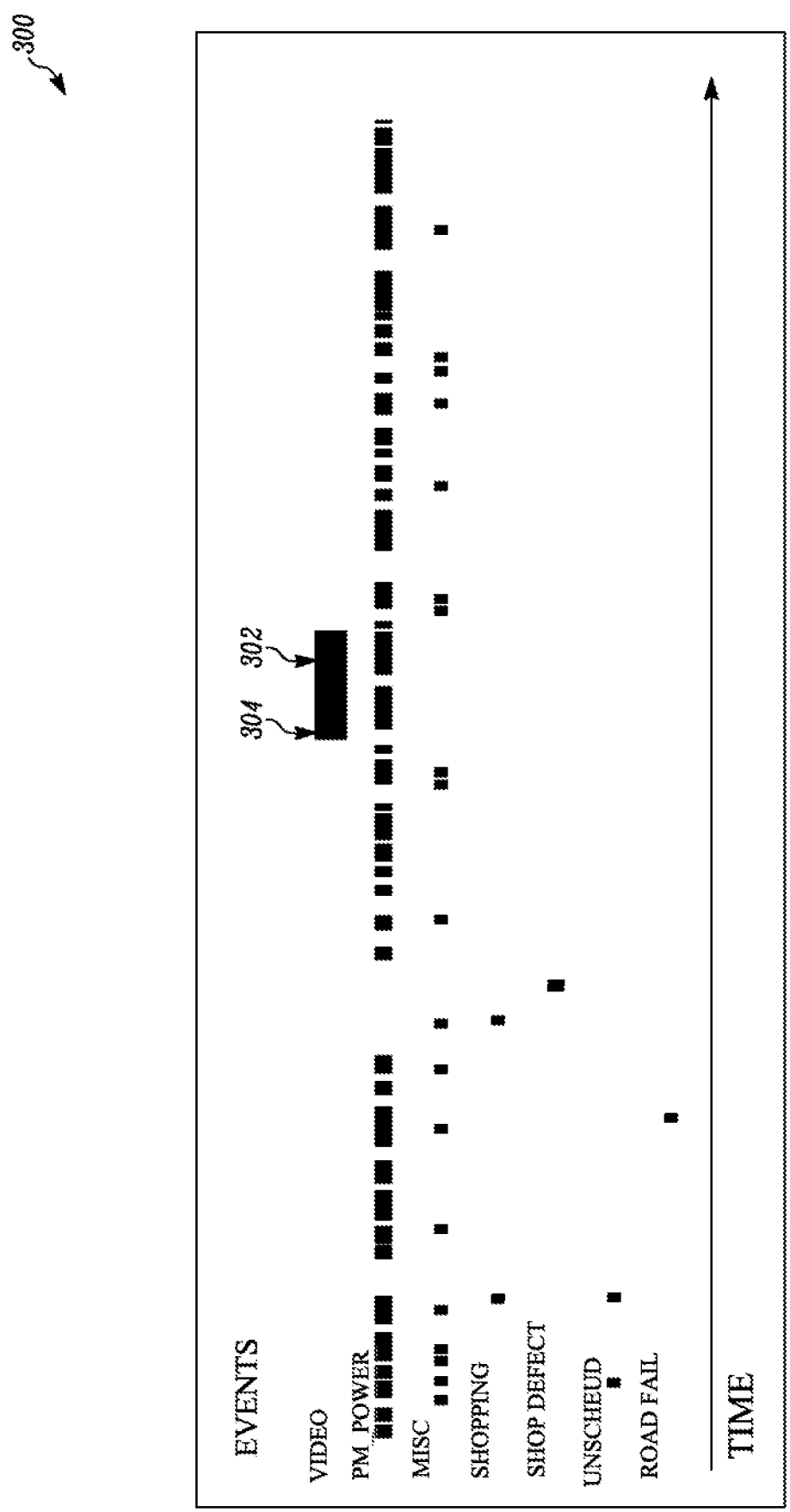
FIG. 3 is a schematic diagram of an exemplary user interface, in accordance with the concepts of the present disclosure.

Referring to FIG. 3, an exemplary user interface 300 is shown as displayed on the display unit 210 by the controller 204. The user interface 300 shows all events tracked along a timeline. In this example, the controller 204 detects the occurrence of the triggering event and records the video feed from the start of the triggering event (depicted on the timeline as 304) until the event has ended. The controller 204 notifies the user that the triggering event has occurred at the given instance in time by providing the notification (depicted as a block 302 on the timeline) on the user interface 300. As can be seen, the notification 302 appears on the timeline related to the events. The amount or duration of the video feed that is recorded for viewing through the notification 302 may be configurable based on the needs of the system. The user may click on the notification 302 to view the stored and recorded video feed associated with the triggering event.

A person of ordinary skill in the art will appreciate that the user interface 300 and the depiction of the notification 302 on the user interface 300 provided in the accompanying drawings is exemplary and does not limit the scope of the present disclosure. The design of the user interface 300 may vary based on the system requirements.

In some embodiments, the controller 204 also provides the user with a notification of a mitigating recommendation or action for providing context to the recorded video feed. In some cases, these contextual actions may further be used by autonomous trains to control the locomotive and provide a more robust self-aware train.

Further, based on the requirements of the system, the controller 204 related logic may either be present on-board or off-board the train 100. Further, the controller 204 may either be integrated with the image capturing device 202 or may be a separate standalone device. The controller 204 may be a microprocessor or other processor as known in the art. The controller 204 may embody a single microprocessor or multiple microprocessors for receiving signals from components of the engine system 100. Numerous commercially available microprocessors may be configured to perform the functions of the controller 204. A person of ordinary skill in the art will appreciate that the controller 204 may additionally include other components and may also perform other functions not described herein.

INDUSTRIAL APPLICABILITY

Figure 4:
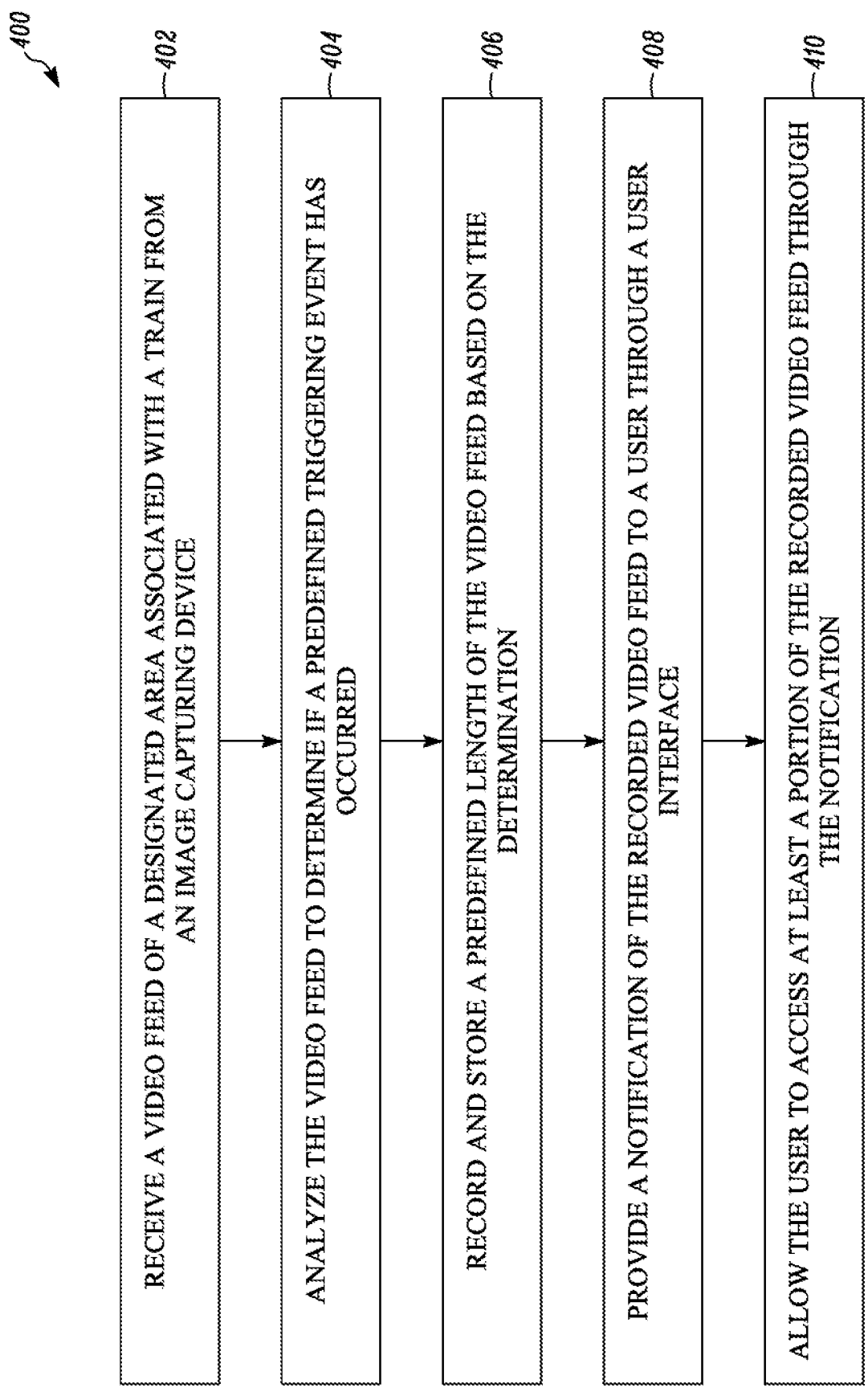
FIG. 4 is a flowchart of a method for monitoring the train of FIG. 1, in accordance with the concepts of the present disclosure.

The present disclosure relates to the system and method for monitoring the train 100. Referring to FIG. 4, at step 402, the controller 204 receives the video feed of the designated area associated with the train 100 from the image capturing device 202. At step 404, the controller 204 analyzes the video feed to determine if the predefined triggering event has occurred. At step 406, the controller 204 records and stores the predefined length of the video feed based on the determination. At step 408, the controller 204 provides the notification of the recorded video feed to the user through the user interface. At step 410, the controller 204 allows the user to access at least a portion of the recorded video feed through the notification.

The system of the present disclosure captures the video feed and makes it available to the user via the user interface. The system determines the priority type of the triggering event and appropriately alerts the user by pushing the notification in the form of the URL link, the thumbnail, the set of images, or the snippet of the video to the user interface where the triggering event is displayed. The user may further interact with the notification by clicking on the notification or hovering the cursor on the notification to provide access to the captured video feed. This notification provided to the user assists in reviewing the captured video. Based on the priority, the notification may be pushed on a real-time basis or later according to the priority type determined by the system.

Hence, the system ensures that the user receives the notification for real time viewing of the high priority type events and that the user does not miss viewing these events. In case of low priority or medium priority type events, the user may access the video of later viewing through the flagged notification. Also, the system automatically sorts through hours of video data and allows for convenient and easy storage of only relevant information that is needed for event logging. This allows for better data storage and data retrieval for monitoring and surveillance purposes. The analysis provided by the system may further be configurable per geofences, locomotive faults, wayside events such as a rock slide detection system linked to a back office, and so on. In some cases, the recorded video feed may also be directly linked to an event or fault logged in a locomotive event recorder/crash hardened memory module. Alternatively, the video feed could be linked and communicated wirelessly to a remote back office and stored off-site for tracking purposes.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A monitoring system for a train, the monitoring system comprising:
   an image capturing device configured to capture a video feed of a designated area associated with the train; and
   a controller coupled to the image capturing device, the controller configured to:
   receive the video feed from the image capturing device;
   analyze the video feed to determine if a predefined triggering event has occurred, the predefined triggering event preceding a predefined rail event;
   record and store a relevant section of the video feed in response to determining that the predefined triggering event has occurred, the relevant section of the video feed having a predefined length;
identify a priority type of the predefined triggering event that occurred, the priority type being one of a low priority, a medium priority and a high priority;
push a notification of the recorded and stored relevant section of the video feed to a user on a user interface immediately upon identifying the priority type of the predefined triggering event that occurred as high priority;
push the notification of the recorded and stored relevant section of the video feed to the user on the user interface once a period of time has elapsed after identifying the priority type of the predefined trigger event that occurred as medium priority or low priority; and
enable access by the user to at least a portion of the recorded and stored relevant section of the video feed through interaction with the notification on the user interface.

2. The monitoring system of claim 1, wherein the controller is coupled to a display unit such that the user interface is provided on the display unit.

3. The monitoring system of claim 1, wherein the controller is further configured to store a timestamp of a start of the triggering event in response to determining that the predefined triggering event has occurred.

4. The monitoring system of claim 1, wherein the controller is further coupled to an electronic control module of the train for determination of the occurrence of the triggering event.

5. The monitoring system of claim 1, wherein the length of the relevant section of the video feed is predefined, such that the monitoring system records the video feed for a predefined time period before each of a start and an end of the triggering event.

6. The monitoring system of claim 1, wherein the controller is configured to any one of:
provide the notification and allow real-time viewing of the recorded and stored relevant section of the video feed in response to identifying the high priority type of the triggering event; or
log and flag the recorded and stored relevant section of the video feed in response to identifying the medium or low priority type of the triggering event.

7. The monitoring system of claim 1, wherein the notification includes one of: a set of images, a thumbnail, or a URL link associated with the recorded video feed.

8. The monitoring system of claim 1, wherein analyzing the video feed includes performing image analysis on the video feed for detecting if the triggering event has occurred.

9. The monitoring system of claim 1, wherein the controller is provided at a location which is one of on-board the train or at a remote location.

10. A method for monitoring a train, the method comprising:
receiving, by a controller, a video feed of a designated area associated with the train from an image capturing device;
analyzing, by the controller, the video feed to determine if a predefined triggering event has occurred, the predefined triggering event preceding a predefined rail event;
recording and storing, by the controller, a relevant section of the video feed in response to determining that the predefined triggering event has occurred, the relevant section of the video feed having a predefined length;
determining a priority type of the predefined triggering event that occurred, the priority type being one of a low priority, a medium priority and a high priority;
pushing, by the controller, a notification of the recorded and stored relevant section of the video feed to a user on a user interface immediately upon determining the priority type of the predefined triggering event that occurred is of high priority;
pushing, by the controller, the notification of the recorded and stored relevant section of the video feed to the user on the user interface once a period of time has elapsed after determining the priority type of the predefined triggering event that occurred is of medium priority or low priority; and
enabling, by the controller, access by the user to at least a portion of the recorded and stored relevant section of the video feed through interaction with the notification on the user interface.

11. The method of claim 10 further comprising storing, by the controller, a timestamp of a start of the triggering event in response to determining that the predefined triggering event has occurred.

12. The method of claim 10 further comprising any one of:
providing the notification and allowing real-time viewing of the recorded and stored relevant section of the video feed in response to identifying the high priority type of the triggering event by the controller; or
logging and flagging the recorded and stored relevant section of the video feed in response to identifying the low or medium priority type of the triggering event by the controller.

13. The method of claim 10, wherein the notification includes one of: a set of images, a thumbnail, or a URL link associated with the recorded video feed.

14. The method of claim 10, wherein analyzing the video feed step includes performing image analysis on the video feed for detecting if the triggering event has occurred.

15. A train comprising:
an engine; and
a monitoring system comprising:
an image capturing device configured to capture a video feed of a designated area associated with the train; and
a controller coupled to the image capturing device, the controller configured to:
receive the video feed from the image capturing device;
analyze the video feed to determine if a predefined triggering event has occurred, the predefined triggering event preceding a predefined rail event;
record and store a relevant section of the video feed in response to determining that the predefined triggering event has occurred, the relevant section of the video feed having a predefined length;
push a notification of the recorded and stored relevant section of the video feed to a user on a user interface immediately upon determining the priority type of the predefined triggering event that occurred is of high priority;
push the notification of the recorded and stored relevant section of the video feed to the user on the user interface once a period of time has elapsed after determining the priority type of the predefined trigger event that occurred is of medium priority or low priority; and enable access by the user to at least a portion of the recorded and stored relevant section of the video feed through interaction with the notification on the user interface.

16. The monitoring system of claim 1, wherein the controller is configured to:
provide a timeline on the user interface; and
provide the notification on the user interface at a position relative to the timeline that indicates a start time of the predetermined triggering event.

17. The monitoring system of claim 16, wherein the controller is configured to provide the notification on the user interface with a width relative to the timeline that indicates a duration of the recorded video feed.

18. The monitoring system of claim 1, wherein the image capturing device is mounted on infrastructure associated with the train.

19. The monitoring system of claim 1, wherein the controller is further configured to provide, to the user, a mitigating action to be taken by the user.

20. The method of claim 10, the method further comprising providing the user with a mitigating action to be taken by the user.

\* \* \* \* \*